US010759888B2

(12) United States Patent
Okabe et al.

(10) Patent No.: US 10,759,888 B2
(45) Date of Patent: Sep. 1, 2020

(54) (METH) ACRYLATE POLYMERS

(71) Applicant: KURARAY CO., LTD., Kurashiki-shi (JP)

(72) Inventors: Fumihiko Okabe, Tainai (JP); Toru Takahashi, Tainai (JP); Atsuhiro Nakahara, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 167 days.

(21) Appl. No.: 16/068,998

(22) PCT Filed: Jan. 12, 2017

(86) PCT No.: PCT/JP2017/000730
§ 371 (c)(1),
(2) Date: Jul. 10, 2018

(87) PCT Pub. No.: WO2017/122707
PCT Pub. Date: Jul. 20, 2017

(65) Prior Publication Data
US 2019/0016839 A1 Jan. 17, 2019

(30) Foreign Application Priority Data
Jan. 12, 2016 (JP) ................................. 2016-003614

(51) Int. Cl.
*C08F 220/14* (2006.01)
*C08F 4/52* (2006.01)
(Continued)

(52) U.S. Cl.
CPC .............. *C08F 220/14* (2013.01); *C08F 2/26* (2013.01); *C08F 4/52* (2013.01); *C08F 20/18* (2013.01)

(58) Field of Classification Search
USPC .................................. 526/177, 328; 508/469
See application file for complete search history.

(56) References Cited

U.S. PATENT DOCUMENTS

| 4,889,900 A | 12/1989 | Dubois |
| 5,264,527 A | 11/1993 | Varshney et al. |

(Continued)

FOREIGN PATENT DOCUMENTS

| JP | 3-31307 A | 2/1991 |
| JP | 6-93060 A | 4/1994 |

(Continued)

OTHER PUBLICATIONS

International Search Report dated Apr. 18, 2017 in PCT/JP2017/000730.

*Primary Examiner* — Fred M Teskin
(74) *Attorney, Agent, or Firm* — Oblon, McClelland, Maier & Neustadt, L.L.P.

(57) ABSTRACT

(Meth)acrylate polymers are provided which have a narrow molecular weight distribution on a higher molecular weight side and can impart high shear viscosity stability to lubricating oils. A (meth)acrylate polymer (A) includes specific structural units and is such that in a differential molecular weight distribution curve obtained by gel permeation chromatography (GPC) measurement which shows the polystyrene-equivalent molecular weight of the (meth)acrylate polymer (A) normalized so that the intensity of the peak-top polystyrene-equivalent molecular weight M (t) is 1, the value a represented by a=Log $M_h$ ($t_{1/2}$)–Log M (t) is not more than 0.12 wherein $M_h$ ($t_{1/2}$) is the polystyrene-equivalent molecular weight at a point on a higher molecular weight side where the intensity is 0.5.

5 Claims, 1 Drawing Sheet

(51) Int. Cl.
*C08F 20/18* (2006.01)
*C08F 2/26* (2006.01)

(56) References Cited

U.S. PATENT DOCUMENTS

| | | |
|---|---|---|
| 5,294,674 A | 3/1994 | Varshney et al. |
| 5,591,816 A | 1/1997 | Varshney et al. |
| 5,668,231 A | 9/1997 | Varshney et al. |
| 6,403,746 B1 | 6/2002 | Roos et al. |
| 6,610,801 B1 | 8/2003 | Scherer |
| 2002/0032290 A1 | 3/2002 | Uchiumi et al. |
| 2005/0245406 A1 | 11/2005 | Scherer et al. |
| 2007/0082827 A1 | 4/2007 | Schmidt et al. |
| 2008/0058234 A1 | 3/2008 | Morishita et al. |
| 2009/0118150 A1 | 5/2009 | Baum et al. |
| 2013/0310291 A1 | 11/2013 | Baum M et al. |
| 2015/0175926 A1 | 6/2015 | Matsui et al. |
| 2015/0184109 A1 | 7/2015 | Matsui et al. |
| 2015/0197705 A1 | 7/2015 | Matsui et al. |
| 2015/0203781 A1 | 7/2015 | Matsui et al. |
| 2015/0203782 A1 | 7/2015 | Matsui et al. |
| 2015/0203785 A1 | 7/2015 | Matsui et al. |
| 2015/0322370 A1 | 11/2015 | Matsui et al. |
| 2018/0037839 A1 | 2/2018 | Baum et al. |

FOREIGN PATENT DOCUMENTS

| | | |
|---|---|---|
| JP | 7-25859 B2 | 3/1995 |
| JP | 11-335432 A | 12/1999 |
| JP | 2002-251009 A | 9/2002 |
| JP | 2003-515630 A | 5/2003 |
| JP | 2004-513997 A | 5/2004 |
| JP | 2007-84658 A | 4/2007 |
| JP | 2007-512413 A | 5/2007 |
| JP | 2007-535595 A | 12/2007 |
| JP | 2008-518051 A | 5/2008 |
| JP | 4681187 B2 | 5/2011 |
| JP | 2015-7228 A | 1/2015 |
| JP | 2015-13957 A | 1/2015 |
| JP | 2015-13962 A | 1/2015 |
| JP | 2015-13964 A | 1/2015 |
| JP | 2015-134913 A | 7/2015 |
| WO | WO 2006/009083 A1 | 1/2006 |
| WO | WO 2014/017553 A1 | 1/2014 |
| WO | WO 2014/017554 A1 | 1/2014 |

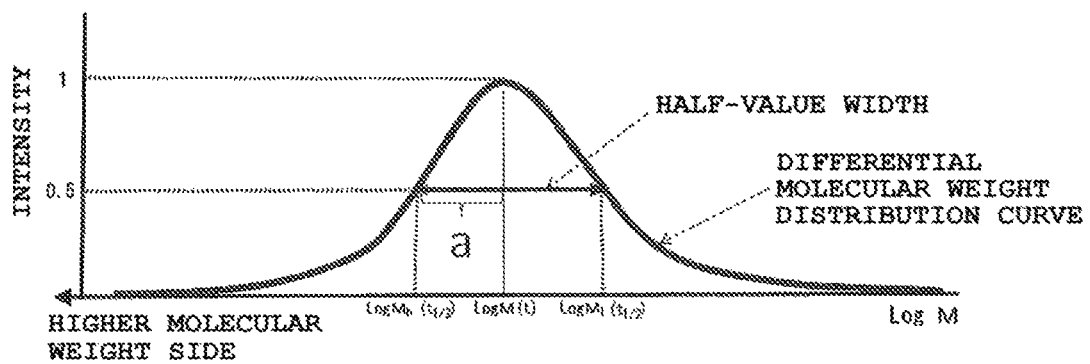

(METH) ACRYLATE POLYMERS

TECHNICAL FIELD

The present invention relates to (meth)acrylate polymers having a narrow molecular weight distribution on a higher molecular weight side. Such (meth)acrylate polymers are useful as, for example, viscosity index improvers for lubricating oils.

BACKGROUND ART

Narrow disperse (meth)acrylate polymers having a small Mw/Mn have been presented as viscosity index improvers which are added to improve the fuel saving performance of lubricating oils used in devices such as automobile engines and other internal combustion engines, transmissions, and the like (see, for example, Patent Literatures 1 to 3).

Such narrow disperse (meth)acrylate polymers are produced by, for example, atom transfer radical polymerization (ATRP), reversible addition-fragmentation chain-transfer polymerization (RAFT), nitroxide-mediated polymerization (NMP), boron-mediated polymerization and catalytic chain transfer (CCT) polymerization (see, for example, Patent Literatures 4 to 6). Another useful production method is anionic polymerization (typically, highly living anionic polymerization) (see, for example, Patent Literature 7). While narrow disperse (meth)acrylate polymers can be obtained by these production methods, there have been demands for (meth)acrylate polymers which can impart high shear viscosity stability to lubricating oils.

CITATION LIST

Patent Literature

Patent Literature 1: JP-A-2015-013957

Patent Literature 2: JP-A-2015-013962

Patent Literature 3: WO 2014/017554

Patent Literature 4: JP-A-2003-515630

Patent Literature 5: JP-A-2008-518051

Patent Literature 6: JP-A-2007-512413

Patent Literature 7: JP-A-2007-084658

SUMMARY OF INVENTION

Technical Problem

An object of the present invention is to provide (meth)acrylate polymers which have a narrow molecular weight distribution on a higher molecular weight side and can impart high shear viscosity stability to lubricating oils.

Solution to Problem

The present inventors carried out extensive studies directed to achieving the above object. As a result, the present inventors have completed the present invention including the aspects described below.

[1] A (meth)acrylate polymer (A) including structural units represented by the general formula (1) below:

[Chem. 1]

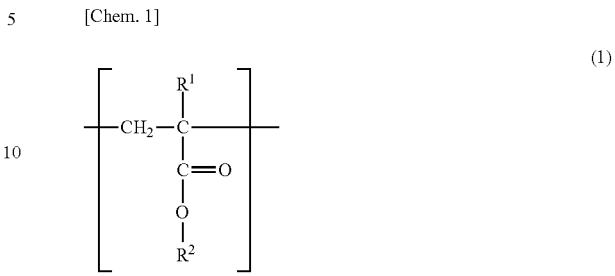

wherein $R^1$ is a hydrogen atom or a methyl group, and $R^2$ is a $C_{10-36}$ alkyl group, the (meth)acrylate polymer (A) being such that in a differential molecular weight distribution curve obtained by gel permeation chromatography (GPC) measurement which shows the polystyrene-equivalent molecular weight of the (meth)acrylate polymer (A) normalized so that the intensity of the peak-top polystyrene-equivalent molecular weight M (t) is 1, the value a represented by the equation (2) below is not more than 0.12:

$$a = \text{Log } M_h(t_{1/2}) - \text{Log } M(t) \qquad (2)$$

wherein $M_h$ ($t_{1/2}$) is the polystyrene-equivalent molecular weight at a point on a higher molecular weight side where the intensity is 0.5.

[2] The (meth)acrylate polymer (A) described in [1], wherein in the differential molecular weight distribution curve described in [1], the half-value width Log $M_h$ ($t_{1/2}$)–Log $M_1$ ($t_{1/2}$) is not more than 0.3 wherein $M_1$ ($t_{1/2}$) is the polystyrene-equivalent molecular weight at a point on a lower molecular weight side where the intensity is 0.5.

[3] The (meth)acrylate polymer (A) described in [1] or [2], wherein the content of the structural units represented by the general formula (1) is 40 to 80 mass % of the mass of all structural units constituting the (meth)acrylate polymer (A).

[4] The (meth)acrylate polymer (A) described in any one of [1] to [3], wherein the polystyrene-equivalent weight average molecular weight Mw calculated by the GPC measurement described in [1] is 50,000 to 500,000.

[5] A method for production of a (meth)acrylate polymer (A) described in any one of [1] to [4], the production being made by anionic polymerization in the presence of an organoaluminum compound.

Advantageous Effects of Invention

The (meth)acrylate polymers obtained according to the present invention have a narrow molecular weight distribution on a higher molecular weight side and can impart high shear viscosity stability to lubricating oils.

BRIEF DESCRIPTION OF DRAWING

The FIGURE shows a schematic diagram illustrating M (t), Mh (t½), Ml (t½), value a and half-value width in a polystyrene-equivalent differential molecular weight curve obtained by GPC measurement of a polymer.

DESCRIPTION OF EMBODIMENTS

The present invention will be described in detail hereinbelow. In the present specification, the term "(meth)acrylic" is generic for "methacrylic" and "acrylic", and the term "(meth)acrylate" is generic for "methacrylate" and "acrylate".

Important characteristics of a (meth)acrylate polymer (A) of the invention are that the polymer has a narrow molecular weight distribution and that, from the point of view of the ability to impart high shear viscosity stability to lubricating oils, the molecular weight distribution on the higher molecular weight side is narrow. The molecular weight distribution on the higher molecular weight side is evaluated in the following manner.

A chromatogram obtained by gel permeation chromatography (GPC) measurement is transformed into a differential molecular weight distribution curve of polystyrene-equivalent molecular weight using a calibration curve which shows relationships between the elution time and the molecular weights of standard polystyrenes. During this process, the measured intensity corresponding to the peak-top polystyrene-equivalent molecular weight M (t) (the molecular weight with the highest measured intensity) of the (meth)acrylate polymer (A) is normalized as 1.

The (meth)acrylate polymer (A) can be said as having a narrow molecular weight distribution on the higher molecular weight side when the differential molecular weight distribution curve obtained as described above shows that the value a represented by the equation (2) below is not more than 0.12 (see the FIGURE). In the equation, $M_h$ ($t_{1/2}$) is the polystyrene-equivalent molecular weight at a point on the higher molecular weight side where the intensity is 0.5. The value a is an indicator of the molecular weight distribution of components having molecular weights higher than the peak-top molecular weight of the (meth)acrylate polymer (A). The smaller the value, the narrower the molecular weight distribution of high-molecular weight components of the (meth)acrylate polymer (A).

$$a = \text{Log } M_h(t_{1/2}) - \text{Log } M(t) \quad (2)$$

To ensure that the (meth)acrylate polymer will offer good shear viscosity stability, the value a is preferably not more than 0.11, more preferably not more than 0.10, and still more preferably not more than 0.095. In the equation (2), Log means the common logarithm (the logarithm with base 10). The value a is usually not less than 0.05.

In the (meth)acrylate polymer (A), it is preferable that the half-value width Log $M_h$ ($t_{1/2}$)–Log $M_l$ ($t_{1/2}$) be not more than 0.3 wherein $M_l$ ($t_{1/2}$) is the polystyrene-equivalent molecular weight at a point on the lower molecular weight side where the intensity is 0.5. It can be said that when the half-value width is 0.3 or less, the molecular weight distribution on the lower molecular weight side is also narrow and the amount of polymer components having a lower molecular weight than M (t) is also small. The use of such a (meth)acrylate polymer (A) in applications such as, for example, viscosity index improvers is advantageous in that the proportion of polymer components making no contribution to the enhancement in viscosity index is small and the dose of the polymer can be decreased. From this point of view, the half-value width is preferably not more than 0.3, and more preferably not more than 0.25. The half-value width is usually not less than 0.1.

The shear viscosity stability may be evaluated based on, for example, the shear stability index (SSI). The SSI is a scale of the loss of kinematic viscosity due to the breakage of molecular chains of polymer components in a lubricating oil by a sliding shear force. A higher value of SSI indicates a greater loss of kinematic viscosity. The SSI, which represents in percentage the shear viscosity loss traced to polymer components, is calculated from the equation below.

$$SSI = \frac{Kv_0 - Kv_1}{Kv_0 - Kv_{oil}} \times 100 \quad [\text{Math. 1}]$$

In the equation, $Kv_0$ is the value of kinematic viscosity at 100° C. of a mixture of the base oil of the lubricating oil and the (meth)acrylate polymer, $Kv_1$ is the value of kinematic viscosity at 100° C. of a mixture of the base oil of the lubricating oil and the (meth)acrylate polymer after the application of shear in accordance with the procedures in ASTM D6278, and $Kv_{oil}$ is the value of kinematic viscosity at 100° C. of the base oil of the lubricating oil.

A smaller value of SSI is more preferable. Specifically, the value is preferably not more than 20%, more preferably not more than 15%, still more preferably not more than 10%, even more preferably not more than 5%, and most preferably not more than 2%.

The (meth)acrylate polymer of the invention is a (meth)acrylate polymer (A) which includes structural units represented by the general formula (1) below. This (meth)acrylate polymer (A) may be obtained by, for example, polymerizing a polymerizable (meth)acrylate monomer(s) including an alkyl (meth)acrylate ester having an alkyl group which will form the structural units of the general formula (1).

[Chem. 2]

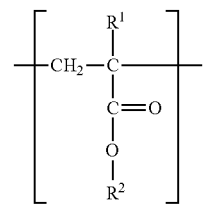

(1)

In the formula (1), $R^1$ is a hydrogen atom or a methyl group, and $R^2$ is a $C_{10-36}$ alkyl group.

[Polymerizable (Meth)Acrylate Monomers]

Examples of the alkyl (meth)acrylate esters having an alkyl group which will form the structural units of the general formula (1) include alkyl (meth)acrylate esters having a $C_{10-36}$ alkyl group. Examples of such alkyl (meth)acrylate esters include alkyl (meth)acrylate esters having a linear alkyl group such as n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-heptadecyl (meth)acrylate, n-octadecyl (meth)acrylate, n-nonadecyl (meth)acrylate, n-eicosyl (meth)acrylate, n-heneicosyl (meth)acrylate, n-docosyl (meth)acrylate, n-tricosyl (meth)acrylate, n-tetracosyl (meth)acrylate, n-pentacosyl (meth)acrylate, n-hexacosyl (meth)acrylate, n-heptacosyl (meth)acrylate, n-octacosyl (meth)acrylate, n-nonacosyl (meth)acrylate, n-triacontyl (meth)acrylate, n-hentriacontyl (meth)acrylate, n-dotriacontyl (meth)acrylate, n-tritriacontyl (meth)acrylate, n-tetratriacontyl (meth)acrylate, n-pentatriacontyl (meth)acrylate and n-hexatriacontyl (meth)acrylate; and alkyl (meth)acrylate esters having a branched alkyl group such as isodecyl (meth)acrylate, 2,4,6-trimethylheptyl (meth)acrylate, 2-butyloctyl (meth)acrylate, 2-ethyl-n-dodecyl (meth)acrylate, 2-methyl-n-tetradecyl (meth)acrylate, isohexadecyl (meth)acrylate, 2-n-octyl-n-nonyl (meth)acrylate, isooctadecyl (meth)acrylate, 1-n-hexyl-n-tridecyl (meth)acrylate, 2-ethyl-n-heptadecyl (meth)acrylate, isoicosyl (meth)acrylate, 1-n-octyl-n-pentadecyl (meth)acrylate, 2-n-decyl-n-tetradecyl (meth)acrylate, 2-n-dodecyl-n-pentadecyl (meth)acrylate, isotriacontyl (meth)acrylate, 2-n-tetradecyl-n-heptadecyl (meth)acrylate, 2-n-hexadecyl-n-heptadecyl (meth)acrylate, 2-n-hexadecyl-n-icosyl (meth)acrylate and 2-n-tetradecyl-n-docosyl (meth)acrylate.

Of the alkyl (meth)acrylate esters having a $C_{10-36}$ alkyl group, those alkyl (meth)acrylate esters having a $C_{10-36}$ branched alkyl group are preferable from the point of view of the effect of enhancing the viscosity index when used as viscosity index improvers for lubricating oils and the like.

Of the alkyl (meth)acrylate esters having a $C_{10-36}$ alkyl group, those alkyl (meth)acrylate esters having a $C_{14-30}$ alkyl group are preferable from the points of view of the effect of enhancing the viscosity index when used as viscosity index improvers, and the shear viscosity stability of lubricating oil compositions; alkyl (meth)acrylate esters having a $C_{16-28}$ alkyl group are more preferable, and alkyl (meth)acrylate esters having a $C_{16-24}$ alkyl group are particularly preferable.

The alkyl (meth)acrylate esters may be used singly, or two or more may be used in combination.

The polymerizable (meth)acrylate monomers may include additional polymerizable (meth)acrylate monomers other than the above alkyl (meth)acrylate esters. Examples of such additional polymerizable (meth)acrylate monomers include (meth)acrylate esters having an alicyclic alkyl group such as cyclopentyl (meth)acrylate, cyclohexyl (meth)acrylate, isobornyl (meth)acrylate and tricyclododecyl (meth)acrylate; (meth)acrylate esters having an aromatic hydrocarbon such as phenyl (meth)acrylate, benzyl (meth)acrylate, naphthyl (meth)acrylate and biphenyl (meth)acrylate; (meth)acrylate esters having an ether group such as methoxymethyl (meth)acrylate, 2-methoxyethyl (meth)acrylate, 2-methoxypropyl (meth)acrylate, 2-ethoxyethyl (meth)acrylate, 2-ethoxypropyl (meth)acrylate, methoxypolyethylene glycol (meth)acrylate and methoxypolypropylene glycol (meth)acrylate; N,N-dialkyl (meth)acrylamides such as N,N-dimethyl (meth)acrylamide, N,N-diethyl (meth)acrylamide, N,N-diisopropyl (meth)acrylamide and N,N-di-n-butyl (meth)acrylamide; (meth)acrylate esters having an epoxy group such as glycidyl (meth)acrylate; and polyfunctional (meth)acrylate esters such as 1,3-propanediol di(meth)acrylate, 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, polyalkylene glycol di(meth)acrylate, bisphenol A di(meth)acrylate, tricyclodecanedimethanol di(meth)acrylate, trimethylolpropane tri(meth)acrylate, glycerin tri(meth)acrylate and pentaerythritol tetra(meth)acrylate.

The additional polymerizable (meth)acrylate monomers which are contained may be alkyl (meth)acrylate esters having a $C_{1-9}$ alkyl group. Examples of such alkyl (meth)acrylate esters include alkyl (meth)acrylate esters having a $C_{1-9}$ linear alkyl group such as methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate and n-nonyl (meth)acrylate; and alkyl (meth)acrylate esters having a $C_{3-9}$ branched alkyl group such as isopropyl (meth)acrylate, isobutyl (meth)acrylate, t-butyl (meth)acrylate, isoamyl (meth)acrylate, t-amyl (meth)acrylate, isohexyl (meth)acrylate, 2-ethylhexyl (meth)acrylate and isononyl (meth)acrylate.

Of the alkyl (meth)acrylate esters having a $C_{1-9}$ alkyl group, those alkyl (meth)acrylate esters having a $C_{1-4}$ alkyl group are preferable, and methyl (meth)acrylate is more preferable from the point of view of the effect of enhancing the viscosity index when used as viscosity index improvers for lubricating oils and the like.

The additional polymerizable (meth)acrylate monomers may be used singly, or two or more may be used in combination.

From the points of view of the effect of enhancing the viscosity index when used as viscosity index improvers, and the shear viscosity stability of lubricating oil compositions, the polymerizable (meth)acrylate monomer is preferably a mixture which includes an alkyl (meth)acrylate ester having a $C_{1-4}$ linear alkyl group, an alkyl (meth)acrylate ester having a $C_{10-36}$ linear alkyl group, and an alkyl (meth)acrylate ester having a $C_{10-36}$ branched alkyl group, and is more preferably a mixture which includes methyl (meth)acrylate, an alkyl (meth)acrylate ester having a $C_{12-20}$ linear alkyl group, and an alkyl (meth)acrylate ester having a $C_{16-28}$ branched alkyl group.

The polymerizable (meth)acrylate monomers are not particularly limited as long as the monomer or monomers used include an alkyl (meth)acrylate ester having a $C_{10-36}$ alkyl group. From the point of view of the effect of enhancing the viscosity index when used as viscosity index improvers, the polymerizable (meth)acrylate monomer is preferably a mixture which includes 5 to 90 mass % of an alkyl (meth)acrylate ester having a $C_{1-4}$ linear alkyl group, 5 to 60 mass % of an alkyl (meth)acrylate ester having a $C_{10-36}$ linear alkyl group, and 5 to 60 mass % of an alkyl (meth)acrylate ester having a $C_{10-36}$ branched alkyl group, and is more preferably a mixture which includes 10 to 60 mass % of methyl (meth)acrylate, 10 to 60 mass % of an alkyl (meth)acrylate ester having a $C_{12-20}$ linear alkyl group, and 10 to 60 mass % of an alkyl (meth)acrylate ester having a $C_{16-29}$ branched alkyl group.

[Hydroxyl-Containing Compounds in Raw Material Including Polymerizable (Meth)Acrylate Monomer]

To obtain the desired (meth)acrylate polymer (A) in the present invention, it is preferable to control the concentration of hydroxyl-containing compounds in the raw material including the polymerizable (meth)acrylate monomer. Some example hydroxyl-containing compounds which may be found in the raw material are water, a compound having a phenolic hydroxyl group, and a compound having an alcoholic hydroxyl group (such as, for example, alcohol).

For example, the compound having a phenolic hydroxyl group is a polymerization inhibitor used to ensure the storage stability of the polymerizable (meth)acrylate monomer. Examples of the compounds having a phenolic hydroxyl group include hydroquinone, methoxyphenol, p-tert-butylcatechol, 2,4-dimethyl-6-tert-butylphenol and 2,6-di-tert-butyl-4-methylphenol. Preferred polymerization inhibitors are hydroquinone, methoxyphenol and 2,6-di-tert-butyl-4-methylphenol which have high polymerization inhibitory effects.

Examples of the compounds having an alcoholic hydroxyl group include alcohols which correspond to the alkyl (meth)acrylate esters present as the polymerizable (meth)acrylate monomers. In particular, an alkyl alcohol having a $C_{10-36}$ alkyl group which corresponds to the alkyl (meth)acrylate ester having a $C_{10-36}$ alkyl group has a high boiling point and is hard to remove completely from the raw material without the alkyl (meth)acrylate ester being affected.

The ratio of the hydroxyl-containing compounds in the raw material is preferably not more than 0.2 parts by mass, and more preferably not more than 0.1 part by mass relative to 100 parts by mass of the polymerizable (meth)acrylate monomer.

In light of the influence on the production of the (meth)acrylate polymer (A), the ratio of water is preferably not more than 0.002 parts by mass, the ratio of the compound having a phenolic hydroxyl group is preferably not more than 0.005 parts by mass, and the ratio of the compound having an alcoholic hydroxyl group is preferably not more than 0.2 parts by mass, relative to 100 parts by mass of the polymerizable (meth)acrylate monomer.

In light of the influence on the production of the (meth)acrylate polymer (A), the ratios of the hydroxyl-containing compounds in the raw material are preferably not less than 0.00001 part by mass for water, not less than 0.00001 part by mass for the compound having a phenolic hydroxyl group, and not less than 0.0001 part by mass for the compound having an alcoholic hydroxyl group, relative to 100 parts by mass of the polymerizable (meth)acrylate monomer.

The reason why the ratios of water and the compound having an alcoholic hydroxyl group are limited to the above lower limits is because it is difficult, from the points of view of removal efficiency and economic efficiency, to remove water or the compound having an alcoholic hydroxyl group present in the raw material below that level. The reason why the ratio of the compound having a phenolic hydroxyl group is limited to the above lower limit is because the storage stability of the polymerizable (meth)acrylate monomer present in the raw material is to be ensured.

In particular, the alkyl (meth)acrylate ester having a $C_{10-36}$ alkyl group which is present in the raw material for the (meth)acrylate polymer (A) of the invention is of high boiling point, and therefore the raw material including such an alkyl (meth)acrylate ester generally tends to contain a large amount of the hydroxyl-containing compound that has remained.

The content of the hydroxyl-containing compounds present in the raw material for the (meth)acrylate polymer (A) may be determined by, for example, an internal standard method or an absolute calibration curve method, using gas chromatography or liquid chromatography.

The content of the hydroxyl-containing compounds present in the raw material for the (meth)acrylate polymer (A) may be reduced by any method without limitation. For example, the content of the hydroxyl-containing compounds may be reduced by distillation, recrystallization or the like of the mixture including the polymerizable (meth)acrylate monomer, or the amount of the hydroxyl-containing compounds may be reduced by adsorption treatment of the mixture including the polymerizable (meth)acrylate monomer using an adsorbent. An alternative method is to consume the raw material alcohol during the production of the polymerizable (meth)acrylate monomer so that less alcohol will remain.

From the points of view of the ratio of the recovery of the raw material including the polymerizable (meth)acrylate monomer and the ease of operation, adsorption treatment is preferably adopted as the method for reducing the content of the hydroxyl-containing compounds.

The adsorbents are not particularly limited as long as they can adsorb and remove the hydroxyl-containing compounds. Because of high adsorption efficiency, activated alumina, silica, activated clay, acid clay, activated carbon, ion exchange resins, zeolites and molecular sieves are preferable. In particular, activated alumina, zeolites and molecular sieves are more preferable.

An example method of the adsorption treatment is such that the adsorbent is mixed together with the mixture including the polymerizable (meth)acrylate monomer batchwise and the resultant mixture is stirred or allowed to stand, or such that the mixture including the polymerizable (meth)acrylate monomer is continuously introduced into a column packed with the adsorbent.

The adsorption treatment may be performed after the mixture including the polymerizable (meth)acrylate monomer is diluted with a solvent. The solvent used here is not particularly limited as long as the adsorption treatment is not adversely affected. Examples include aliphatic hydrocarbons such as pentane, n-hexane and octane; alicyclic hydrocarbons such as cyclopentane, methylcyclopentane, cyclohexane, methylcyclohexane and ethylcyclohexane; aromatic hydrocarbons such as benzene, toluene, ethylbenzene and xylene; and ethers such as diethyl ether, tetrahydrofuran, 1,4-dioxane, anisole and diphenyl ether. Of these, aromatic hydrocarbons are preferable for reasons such as that the solvent can be continuously used for the polymerization reaction which follows and that the solvent can be easily recovered and purified. Toluene and xylene are more preferable. The solvents may be used singly, or two or more may be used in combination.

The mixture which will be subjected to the reduction of the content of the hydroxyl-containing compounds may include two or more kinds of polymerizable (meth)acrylate monomers or may include only a single kind of a polymerizable (meth)acrylate monomer. It is preferable that the mixture to be subjected to the reduction treatment include only a single kind of a polymerizable (meth)acrylate monomer for reasons such as that the determination of appropriate conditions is easy and the reduction of the content of the hydroxyl-containing compounds is facilitated. Thus, when the feedstock for the (meth)acrylate polymer (A) includes two or more kinds of polymerizable (meth)acrylate monomers, it is preferable that a plurality of kinds of mixtures be provided which each include only a single kind of a polymerizable (meth)acrylate monomer and which differ from one another in the type of the polymerizable (meth)acrylate monomer contained, at least one of such mixtures be subjected to the method of reducing the content of the hydroxyl-containing compounds, and the plurality of kinds of mixtures be mixed together so that the feedstock will attain the desired state.

[Methods for Producing Mixture Including Polymerizable (Meth)Acrylate Monomer]

The mixture including the polymerizable (meth)acrylate monomer that is the raw material for the (meth)acrylate polymer (A) obtained in the present invention may be produced by a method that is known or is deemed as known, without limitation. Some example methods are transesterification of a (meth)acrylate ester having a short chain alkyl group such as methyl (meth)acrylate with an alkyl alcohol in the presence of a Brønsted acid and a Lewis acid catalyst, esterification (condensation) of (meth)acrylic acid with an alkyl alcohol in the presence of an acid catalyst such as sulfuric acid, p-toluenesulfonic acid, methanesulfonic acid or a solid acid, and reaction of (meth)acryloyl chloride or (meth)acrylic anhydride with an alkyl alcohol in the presence of a base such as triethylamine or pyridine.

The mixture including the polymerizable (meth)acrylate monomer may be collected from the reaction liquid by a known method such as extraction or recrystallization without limitation. When, for example, the reaction involves (meth)acrylic acid and an alkyl alcohol, the mixture including the polymerizable (meth)acrylate monomer may be collected from the reaction liquid in such a manner that, for example, the reaction is performed by heating the (meth)acrylic acid and the alkyl alcohol in an organic solvent such as toluene or hexane in the presence of an acid catalyst such as sulfuric acid, p-toluenesulfonic acid, methanesulfonic acid or a solid acid while removing resultant water by azeotropic dehydration out of the system, then the acid catalyst is neutralized by the addition of an aqueous solution of an alkali such as sodium hydroxide to the reaction liquid, followed by extraction, and thereafter the solvent in the organic phase is distilled away.

The production of the mixture including the polymerizable (meth)acrylate monomer preferably involves a polymerization inhibitor. For example, the polymerization inhibitor may be a quinone such as hydroquinone, methylhydroquinone or benzoquinone; a compound with at least one phenolic hydroxyl group selected from methoxyphenol, p-tert-butylcatechol, 2,4-dimethyl-6-tert-butylphenol and 2,6 di tert-butyl-4-methylphenol; cupferron or phenothiazine. Hydroquinone, methoxyphenol, p-tert-butylcatechol and 2,6-di-tert-butyl-4-methylphenol are preferably used as the polymerization inhibitors because of their high polymerization inhibiting effects.

To ensure that the polymerization of the (meth)acrylic acid and the (meth)acrylate ester will be prevented, the amount of the polymerization inhibitor used in the production of the mixture including the polymerizable (meth)acrylate monomer is preferably not less than 0.001 mass %, more preferably not less than 0.005 mass %, and still more preferably not less than 0.01 mass % relative to the total mass of the (meth)acrylic acid and the alkyl (meth)acrylate ester in the raw material. From the point of view of the usefulness of the product, the amount is preferably not more than 10 mass %, more preferably not more than 1 mass %, and still more preferably not more than 0.5 mass %.

To prevent polymerization from occurring during storage, the content of the polymerization inhibitor in the mixture including the polymerizable (meth)acrylate monomer is preferably not less than 0.00001 part by mass, more preferably not less than 0.0001 part by mass, and still more preferably not less than 0.0005 parts by mass per 100 parts by mass of the polymerizable (meth)acrylate monomer. To facilitate the removal of the inhibitor before the polymerization of the mixture, the content is preferably not more than 0.5 parts by mass, more preferably not more than 0.2 parts by mass, and still more preferably not more than 0.1 part by mass.

The mixture as the raw material for the (meth)acrylate polymer (A) may include only a single kind of a polymerizable (meth)acrylate monomer or may include two or more kinds of polymerizable (meth)acrylate monomers. When the feedstock is a mixture including two or more kinds of polymerizable (meth)acrylate monomers, a plurality of kinds of mixtures which each include one or more kinds of polymerizable (meth)acrylate monomers may be provided and mixed together to yield the feedstock for the (meth)acrylate polymer (A).

[Properties of (Meth)Acrylate Polymer (A)]

The weight average molecular weight Mw of the (meth)acrylate polymer (A) of the invention is preferably 50,000 to 500,000, more preferably 100,000 to 400,000, and still more preferably 150,000 to 300,000.

In the (meth)acrylate polymer (A) of the invention, the ratio of Mw to number average molecular weight (hereinafter, "Mn") (Mw/Mn, hereinafter, "molecular weight distribution") is preferably not more than 1.6, more preferably 1.01 to 1.6, still more preferably 1.05 to 1.6, and particularly preferably 1.05 to 1.5. When the molecular weight distribution is in this range, the (meth)acrylate polymer exhibits superior effects in improving the viscosity index when used as a viscosity index improver and offers excellent shear viscosity stability of a lubricating oil composition. The Mw and Mn depend on, for example, the amounts of the hydroxyl-containing compounds and the polymerization inhibitor present in the raw material including the polymerizable (meth)acrylate monomer used in the production of the (meth)acrylate polymer (A). The Mw and Mn are polystyrene-equivalent molecular weights measured by the aforementioned GPC analysis.

In the (meth)acrylate polymer (A) of the invention, the content of the structural units represented by the general formula (1) is preferably 40 to 80 mass %, and more preferably 50 to 70 mass %. This range ensures that the polymer used as a viscosity index improver will be dissolved easily into a base oil even at a low temperature.

[Methods for Producing (Meth)Acrylate Polymer (A)]

The (meth)acrylate polymer (A) of the invention may be produced by any methods without limitation. To ensure that the value a will fall in the desired range, the production is preferably made by controlled radical polymerization such as atom transfer radical polymerization (ATRP), reversible addition-fragmentation chain-transfer polymerization (RAFT), nitroxide-mediated polymerization (NMP), iodine transfer polymerization, polymerization using hetero elements deep in the periodic table (such as organic tellurium, antimony and bismuth), boron-mediated polymerization, catalytic chain transfer (CCT) polymerization or polymerization using metals such as cobalt and titanium and carbon bonds as dormant species (OMRP), or by anionic polymerization (typically, highly living anionic polymerization). In particular, anionic polymerization is more preferable because the (meth)acrylate polymer (A) that is obtained is of high thermal stability. Examples of such anionic polymerization methods include anionic polymerization using an organoalkali metal compound as a polymerization initiator in the presence of a mineral acid salt such as an alkali metal or alkaline earth metal salt (see JP-B-H07-25859), anionic polymerization using an organoalkali metal compound as a polymerization initiator in the presence of an organoaluminum compound (see JP-A-H11-335432), and anionic polymerization using an organic rare earth metal complex or a metallocene metal complex as a polymerization initiator (see JP-A-H06-93060).

For the reasons that the polymer that is obtained has a smaller Mw/Mn, offers good shear viscosity stability when used as a viscosity index improver, and has high syndiotacticity to exhibit high effects in improving the viscosity index when used as a viscosity index improver, it is preferable to adopt anionic polymerization using an organoalkali metal compound as a polymerization initiator in the presence of an organoaluminum compound.

The (meth)acrylate polymer (A) is preferably produced by anionic polymerization using an organoalkali metal compound as a polymerization initiator in the presence of an organoaluminum compound. For example, this preferred method is performed by polymerizing the polymerizable (meth)acrylate monomer in the presence of an organolithium compound and an organoaluminum compound represented by the following general formula (2):

$$AlR^aR^bR^c \tag{2}$$

wherein $R^a$, $R^b$ and $R^c$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group, or wherein $R^a$ represents any of the above groups and $R^b$ and $R^c$ together represent an optionally substituted arylenedioxy group, and, where necessary, further in the presence of an ether such as dimethyl ether, dimethoxyethane, diethoxyethane or 12-crown-4; and/or a nitrogen-containing compound such as triethylamine, N,N,N',N'-tetramethylethylenediamine, N,N, N',N'',N''-pentamethyldiethylenetriamine, 1,1,4,7,10,10-hexamethyltriethylenetetramine, pyridine or 2,2'-dipyridyl in the reaction system.

For example, the organolithium compound used in the anionic polymerization method may be one, or two or more of alkyllithiums and alkyldilithiums such as methyllithium, ethyllithium, n-propyllithium, isopropyllithium, n-butyllithium, sec-butyllithium, isobutyllithium, tert-butyllithium, n-pentyllithium, n-hexyllithium, tetramethylenedilithium, pentamethylenedilithium and hexamethylenedilithium; aryllithiums and aryldilithiums such as phenyllithium, m-tolyllithium, p-tolyllithium, xylyllithium and lithium naphthalene; aralkyllithiums and aralkyldilithiums such as benzyllithium, diphenylmethyllithium, trityllithium, 1,1-diphenyl-3-methylpentyllithium, α-methylstyryllithium and dilithium formed by the reaction of diisopropenylbenzene and butyllithium; lithium amides such as lithium dimethylamide, lithium diethylamide and lithium diisopropylamide; and lithium alkoxides such as methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, phenoxylithium, 4-methylphenoxylithium, benzyloxylithium and 4-methylbenzyloxylithium.

For example, the organoaluminum compound of the general formula (2) that is used may be one, or two or more of trialkylaluminums such as trimethylaluminum, triethylaluminum, tri isobutylaluminum and tri-n-octylaluminum; dialkylphenoxyaluminums such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy) aluminum, diisobutyl(2,6-di-tert-butyl-4-methylphenoxy) aluminum and diisobutyl(2,6-di-tert-butylphenoxy) aluminum; alkyldiphenoxyaluminums such as methylbis(2, 6-di-tert-butyl-4-methylphenoxy)aluminum, methylbis(2,6-di-tert-butylphenoxy)aluminum, ethyl[2,2'-methylenebis(4-methyl-6-tert-butylphenoxy)]aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)]aluminum; alkoxydiphenoxyaluminums such as methoxybis(2,6-di-tert-butyl-4-methylphenoxy)aluminum, methoxybis(2,6-di-tert-butylphenoxy)aluminum, methoxy[2,2'-methylenebis (4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2, 6-di-tert-butylphenoxy)aluminum and isopropoxy[2,2'-methylenebis(4-methyl-6-tert-butylphenoxy)]aluminum; and triphenoxyaluminums such as tris(2,6-di-tert-butyl-4-methylphenoxy)aluminum and tris(2,6-diphenylphenoxy) aluminum. In particular, among others, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)]aluminum are particularly preferable for use because they are handleable easily and can allow the polymerization of the polymerizable (meth)acrylate monomer to proceed under relatively mild temperature conditions without being deactivated.

The method involving anionic polymerization is preferably performed in a solvent. The solvent is not particularly limited as long as the reaction is not adversely affected. Examples include aliphatic hydrocarbons such as pentane, n-hexane and octane; alicyclic hydrocarbons such as cyclopentane, methylcyclopentane, cyclohexane, methylcyclohexane and ethylcyclohexane; aromatic hydrocarbons such as benzene, toluene, ethylbenzene and xylene; and ethers such as diethyl ether, tetrahydrofuran, 1,4-dioxane, anisole and diphenyl ether. Of these, aromatic hydrocarbons are preferable for reasons such as that these solvents have high solvent properties for the resultant homopolymer or copolymer, are unlikely to mix into the waste liquid, and are easily recovered and purified. Toluene and xylene are more preferable. The solvents may be used singly, or two or more may be used in combination. To let the polymerization reaction proceed smoothly, it is preferable that the solvent be purified by deaeration and dehydration beforehand.

The production of the (meth)acrylate polymer (A) preferably takes place in an atmosphere of an inert gas such as nitrogen, argon or helium.

In the production of the (meth)acrylate polymer (A), the polymerization temperature may be selected appropriately in accordance with factors such as the type of the (meth) acrylate ester used and its concentration in the polymerization reaction liquid. When the polymer is produced by anionic polymerization using an organoalkali metal compound as a polymerization initiator in the presence of an organoaluminum compound, it is usually preferable that the temperature be in the range of −20 to 80° C. for reasons such as that the polymerization time can be shortened and little deactivation reaction occurs during the polymerization. Such temperature conditions are much milder than the conventional conditions for the anionic polymerization of polymerizable (meth)acrylate monomers, and thus make it possible to significantly reduce the costs associated with cooling facilities in the industrial implementation of the method of the invention, as compared to the conventional methods.

The polymerization mode for the production of the (meth) acrylate polymer (A) may be, for example, batchwise polymerization mode or continuous polymerization mode.

For example, the (meth)acrylate polymer (A) may be obtained by terminating the polymerization reaction by the addition of a polymerization terminator to the polymerization reaction liquid that flows out continuously from the final reactor in the production line. Examples of the polymerization terminators include protic compounds such as water, methanol, acetic acid and hydrochloric acid. The amount in which the polymerization terminator is used is not particularly limited, but is usually in the range of 1 to 100 molar times the amount of the polymerization initiator used.

If aluminum originating from the organoaluminum compound used remains in the (meth)acrylate polymer (A) that has been separated and collected from the polymerization reaction liquid after the termination of the polymerization, properties of the (meth)acrylate polymer (A) or a material which includes the polymer may be deteriorated. It is therefore preferable to remove aluminum originating from the organoaluminum compound after the completion of the polymerization. Such aluminum may be effectively removed by washing, after the addition of the polymerization terminator, the polymerization reaction liquid with an acidic aqueous solution, or by subjecting the polymerization reaction liquid to treatment such as adsorption treatment using an adsorbent such as an ion exchange resin.

After the polymerization has been terminated and aluminum has been removed, the (meth)acrylate polymer (A) may be separated and collected from the polymerization reaction liquid by any known method appropriately without limitation. For example, the polymerization reaction liquid may be poured into a poor solvent for the (meth)acrylate polymer (A) to precipitate the (meth)acrylate polymer (A); or the solvent may be distilled away from the polymerization reaction liquid under reduced pressure to leave the (meth) acrylate polymer (A). An alternative method is such that large proportions of the solvent and low-boiling components are removed from the polymerization reaction liquid by using, for example, a thin film evaporator, the residue is continuously supplied to a melt extruder, in which components such as the solvent are evaporated under reduced pressure, and the (meth)acrylate polymer (A) is recovered as a strand, pellets or blocks. The polymer may be collected as the polymerization reaction liquid, or the polymer may be collected in the form of a solution in a solvent which has replaced the polymerization solvent utilizing its higher boiling point than the polymerization solvent.

The (meth)acrylate polymer (A) of the invention may be a homopolymer produced from a single monomer, or may be a copolymer produced from a plurality of monomers. The homopolymer may be linear or shaped like a star. The copolymer may be a random copolymer, a block copolymer, a graft copolymer or a star-shaped copolymer.

Additives may be added to the (meth)acrylate polymer (A) of the invention, with examples including antioxidants, thermal deterioration inhibitors, light stabilizers, UV absorbers, lubricants, release agents, polymeric processing aids, antistatic agents, flame retardants, dyes and pigments, light diffusing agents, organic dyes, matting agents, impact modifiers, fluorescent materials, antiwear agents (or extreme pressure agents), corrosion inhibitors, rust inhibitors, viscosity index improvers, pour point depressants, demulsifiers, metal deactivators, antifoaming agents and ashless friction modifiers.

The (meth)acrylate polymer (A) of the invention has a narrow molecular weight distribution and excellent mechanical characteristics such as shear viscosity stability, and thus can be used in various applications including not only viscosity index improvers but also polyolefin modifiers, pressure-sensitive adhesives, adhesives, primers, surface-functionalizing coating agents such as hard coats, and tire modifiers. The polymer may be particularly preferably used as a viscosity index improver on account of the facts that the polymer has high solubility in engine oils and can decrease the temperature dependence of the viscosity of engine oils.

EXAMPLES

Hereinbelow, the present invention will be described in greater detail based on Examples and Comparative Examples. However, it should be construed that the scope of the invention is not limited to such examples. Properties and other data were measured by the following methods.
(Content of Polymerizable (Meth)Acrylate Monomer, Content of Phenolic Hydroxyl-Containing Compound, and Content of Alcoholic Hydroxyl-Containing Compound)

Inert Cap 1 column (df=0.4 μm, 0.25 mm I.D.×60 m) manufactured by GL Sciences Inc. was connected to Gas chromatograph GC-2014 manufactured by Shimadzu Corporation. The measurement was performed under conditions in which the injection temperature was set to 240° C., the detector temperature to 300° C., and the column temperature was increased from 180° C. to 280° C. at a heat-up rate of 10° C./min and was held constant for 10 minutes. The purity of a polymerizable (meth)acrylate monomer was calculated from the simple area detected by the gas chromatography. The content of a phenolic hydroxyl-containing compound and that of an alcoholic hydroxyl-containing compound were calculated as mass ratios relative to 100 parts by mass of the monomer using an absolute calibration curve method.
(Amount of Water in Raw Material)

The amount of water in the monomer was measured using coulometric titration Karl Fischer moisture meter CA-200 manufactured by Mitsubishi Chemical Analytic Inc., and was expressed as a mass ratio relative to 100 parts by mass of the monomer.
(Weight Average Molecular Weight (Mw), Number Average Molecular Weight (Mn) and Molecular Weight Distribution (Mw/Mn))

Gel permeation chromatography (GPC) measurement was performed under the conditions described below. The chromatogram obtained was analyzed to calculate the values of Mw, Mn and Mw/Mn relative to the molecular weights of standard polystyrenes. The baseline was drawn in the GPC chart by connecting the point at which the slope of the peak on the higher molecular weight side changed from zero to positive with the passage of retention time, to the point at which the slope of the peak on the lower molecular weight side changed from negative to zero with the passage of retention time.

GPC apparatus: HLC-8320 manufactured by TOSOH CORPORATION

Detector: differential refractometer detector

Columns: Two TSKgel SuperMultipore HZM-M columns and SuperHZ4000 manufactured by TOSOH CORPORATION were connected in series.

Eluent: tetrahydrofuran

Eluent flow rate: 0.35 ml/min

Column temperature: 40° C.

Calibration curve: prepared using data of ten standard polystyrenes
(Composition of Monomers in Polymer)

With use of a nuclear magnetic resonance apparatus (ULTRA SHIELD 400 PLUS manufactured by Bruker), a $^1$H-NMR spectrum was measured with respect to 10 mg of the resin dissolved in 1 mL of deuterated chloroform under conditions of room temperature and 64 scans. In the spectrum, the areas were determined of the signals at 3.3 to 4.2 ppm, with reference to TMS taken as 0 ppm, arising from the methylene or methine, and methyl groups adjacent to the oxygen atom in the ester group. The composition of structural units derived from monomers in the (meth)acrylate polymer (A) was thus calculated.

Production Example 1

A 500 mL three-necked flask equipped with a thermometer, a distillation column (2 cm in inner diameter, 25 cm in length) packed with glass raschig rings, and a glass capillary was loaded with 455 g of a mixture including 2-octyldodecyl methacrylate (a polymerizable (meth)acrylate monomer) synthesized by esterification of 2-octyldodecanol with methacrylic acid (the mixture containing 98.67° 2-octyldodecyl methacrylate and, per 100 parts by mass of 2-octyldodecyl methacrylate, 0.0101 parts by mass of methoxyphenol, 0.2533 parts by mass of 2-octyldodecanol and 0.0203 parts by mass of water), and 0.46 g of ADK STAB AO-60 (a phenolic hydroxyl-containing compound, manufactured by ADEKA CORPORATION) as a polymerization inhibitor. While bubbling the mixture with air supplied from the glass capillary, distillation was performed at an inner pressure of 0.1 kPa, an inner temperature of 214 to 234° C., a column top temperature of 185 to 191° C. for 18 hours to separate the mixture into approximately 70 g fractions. The fraction with the least contents of 2-octyldodecanol and methoxyphenol was obtained as a raw material (1) for (meth)acrylate polymer (A). This raw material weighed 82.1 g (recovery ratio 18.0%). Gas chromatography and the measurement with the Karl Fischer moisture meter showed that the raw material (1) for (meth)acrylate polymer (A) contained 99.54% 2-octyldodecyl methacrylate and, per 100 parts by mass of the polymerizable (meth)acrylate monomer, 0.0007 parts by mass of water and 0.017 parts by mass of 2-octyldodecanol. Methoxyphenol and ADK STAB AO-60 were not detected.

Production Example 2

A 1 L three-necked flask equipped with a thermometer and a mechanical stirrer was loaded with 250 g of a mixture including n-stearyl methacrylate (a polymerizable (meth)acrylate monomer) synthesized by esterification of n-stearyl alcohol with methacrylic acid (the mixture containing 99.26% n-stearyl methacrylate and, per 100 parts by mass of n-stearyl methacrylate, 0.0252 parts by mass of methoxyphenol, 0.3425 parts by mass of n-stearyl alcohol and 0.0181 parts by mass of water), and 583 g of isopropanol. The n-stearyl methacrylate was dissolved by stirring at 25° C. Thereafter, the solution was cooled to −20° C. in 4 hours. The crystal that had precipitated was recovered by filtration and was dried to afford 243.3 g (recovery ratio 97.3%) of a crystalline raw material (2) for (meth)acrylate polymer (A). Gas chromatography and the measurement with the Karl Fischer moisture meter showed that the raw material (2) for (meth)acrylate polymer (A) contained 99.67% n-stearyl methacrylate and, per 100 parts by mass of the polymerizable (meth)acrylate monomer, 0.001 part by mass of water and 0.006 parts by mass of n-stearyl alcohol. Methoxyphenol was not detected.

Production Example 3

A 500 mL three-necked flask containing a magnetic stirring rod was loaded with 90 g of a mixture including 2-octyldodecyl methacrylate (a polymerizable (meth)acrylate monomer) synthesized by esterification of 2-octyldodecanol with methacrylic acid (the mixture containing 98.67% 2-octyldodecyl methacrylate and, per 100 parts by mass of 2-octyldodecyl methacrylate, 0.0101 parts by mass of methoxyphenol, 0.2533 parts by mass of 2-octyldodecanol and 0.0203 parts by mass of water), 210 g of toluene and, as an adsorbent, 30 g of activated alumina GP-20 manufactured by MIZUSAWA INDUSTRIAL CHEMICALS, LTD. Stirring was performed at 25° C. for 4 hours. Thereafter, the activated alumina was removed by filtration, and toluene was distilled away using an evaporator at a liquid temperature of not more than 35° C. Consequently, 86.1 g of a liquid raw material (3) for (meth)acrylate polymer (A) was obtained. Gas chromatography and the measurement with the Karl Fischer moisture meter showed that the raw material (3) for (meth)acrylate polymer (A) contained 98.88% 2-octyldodecyl methacrylate and, per 100 parts by mass of the polymerizable (meth)acrylate monomer, 0.0006 parts by mass of water and 0.14 parts by mass of 2-octyldodecanol. Methoxyphenol was not detected.

Production Example 4

A 500 mL three-necked flask containing a magnetic stirring rod was loaded with 90 g of a mixture including n-stearyl methacrylate (a polymerizable (meth)acrylate monomer) synthesized by esterification of n-stearyl alcohol with methacrylic acid (the mixture containing 99.26% n-stearyl methacrylate and, per 100 parts by mass of n-stearyl methacrylate, 0.0252 parts by mass of methoxyphenol, 0.3425 parts by mass of n-stearyl alcohol and 0.0181 parts by mass of water), 210 g of toluene and, as an adsorbent, 30 g of activated alumina GP-20 manufactured by MIZUSAWA INDUSTRIAL CHEMICALS, LTD. Stirring was performed at 25° C. for 4 hours. Thereafter, the activated alumina was removed by filtration, and toluene was distilled away using an evaporator at a liquid temperature of not more than 35° C. Consequently, 87.2 g of a liquid raw material (4) for (meth)acrylate polymer (A) was obtained. Gas chromatography and the measurement with the Karl Fischer moisture meter showed that the raw material (4) for (meth)acrylate polymer (A) contained 99.20% n-stearyl methacrylate and, per 100 parts by mass of the polymerizable (meth)acrylate monomer, 0.0007 parts by mass of water and 0.11 parts by mass of 2-stearyl alcohol. Methoxyphenol was not detected.

Production Example 5

A raw material (5) for (meth)acrylate polymer (A) was prepared by adding p-methoxyphenol to the raw material (3) from Production Example 3 which contained 2-octyldodecyl methacrylate, in a ratio of 0.0005 parts by mass to 100 parts by mass of the polymerizable (meth)acrylate monomer.

Production Example 6

A raw material (6) for (meth)acrylate polymer (A) was prepared by adding p-methoxyphenol to the raw material (4) from Production Example 4 which contained n-stearyl methacrylate, in a ratio of 0.0005 parts by mass to 100 parts by mass of the polymerizable (meth)acrylate monomer.

Production Example 7

A raw material (7) for (meth)acrylate polymer (A) was prepared by adding 2-octyldodecanol to the raw material (3) from Production Example 3 which contained 2-octyldodecyl methacrylate, in a ratio of 0.32 parts by mass to 100 parts by mass of the polymerizable (meth)acrylate monomer.

Production Example 8

A raw material (8) for (meth)acrylate polymer (A) was prepared by adding n-stearyl alcohol to the raw material (4) from Production Example 4 which contained n-stearyl methacrylate, in a ratio of 0.36 parts by mass to 100 parts by mass of the polymerizable (meth)acrylate monomer.

Example 1

A (meth)acrylate polymer was produced as described below with reference to JP-A-2007-84658. The inside of a thoroughly dried, 2 L three-necked flask was purged with nitrogen. At room temperature, there were added 480 g of toluene, 24 g of 1,2-dimethoxyethane, and 10 g of a 0.45 M toluene solution of isobutylbis(2,6-di-t-butyl-4-methylphenoxy)aluminum. Further, 0.62 g of a 1.0 mmol solution of sec-butyllithium in a mixed solvent of cyclohexane and n-hexane was added. Subsequently, 85 g of a mixture as a feedstock was added which contained 30 mass % of the raw material (1) from Production Example 1 which contained 2-octyldodecyl methacrylate as a polymerizable (meth)acrylate monomer, 30 mass % of the raw material (2) from Production Example 2 which contained stearyl methacrylate as a polymerizable (meth)acrylate monomer synthesized in Production Example 2, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.0070 parts by mass and the content of water was 0.0006 parts by mass per 100 parts by mass of the polymerizable (meth)acrylate monomers, and the content of phenolic hydroxyl-containing compounds was below the detection limit). The resultant mixture was stirred at room temperature for 12 hours. The reaction liquid was yellow at first, but became colorless after the 12 hours of stirring. Thereafter, the polymerization reaction was terminated by the addition of 1.0 g of methanol. The reaction liquid obtained was poured into 6.0 kg of methanol to precipitate a white precipitate. Thereafter, the white precipitate was recovered by filtration and was dried to afford 80 g of a methacrylate polymer.

$^1$H-NMR measurement and GPC measurement showed that the methacrylate polymer obtained was a random copolymer having a weight average molecular weight (Mw) of 81800, a number average molecular weight (Mn) of 75600 and a molecular weight distribution (Mw/Mn) of 1.08.

The mass ratio of the structures derived from the respective monomers in the methacrylate polymer was 40 mass % for the structures derived from methyl methacrylate, 30 mass % for the structures derived from stearyl methacrylate, and 30 mass % for the structures derived from 2-octyldodecyl methacrylate. The results are described in Table 1.

Example 2

A methacrylate polymer weighing 80 g was obtained in the same manner as in Example 1, except that 0.62 g of the 1.0 mmol solution of sec-butyllithium in a mixed solvent of cyclohexane and n-hexane was replaced by 0.39 g of a 0.64 mmol solution of sec-butyllithium in a mixed solvent of cyclohexane and n-hexane. The results of the evaluations of the methacrylate polymer are described in Table 1.

Example 3

A methacrylate polymer weighing 80 g was obtained in the same manner as in Example 1, except that 0.62 g of the 1.0 mmol solution of sec-butyllithium in a mixed solvent of cyclohexane and n-hexane was replaced by 0.33 g of a 0.55 mmol solution of sec-butyllithium in a mixed solvent of cyclohexane and n-hexane. The results of the evaluations of the methacrylate polymer are described in Table 1.

Example 4

A methacrylate polymer weighing 80 g was obtained in the same manner as in Example 1, except that 0.62 g of the 1.0 mmol solution of sec-butyllithium in a mixed solvent of cyclohexane and n-hexane was replaced by 0.27 g of a 0.44 mmol solution of sec-butyllithium in a mixed solvent of cyclohexane and n-hexane. The results of the evaluations of the methacrylate polymer are described in Table 1.

Example 5

A methacrylate polymer weighing 80 g was obtained in the same manner as in Example 1, except that 0.62 g of the 1.0 mmol solution of sec-butyllithium in a mixed solvent of cyclohexane and n-hexane was replaced by 0.25 g of a 0.41 mmol solution of sec-butyllithium in a mixed solvent of cyclohexane and n-hexane. The results of the evaluations of the methacrylate polymer are described in Table 1.

Example 6

A methacrylate polymer weighing 80 g was obtained in the same manner as in Example 3, except that the feedstock used in Example 3 was replaced by 85 g of a feedstock mixture which contained 30 mass % of the raw material (3) from Production Example 3 which contained 2-octyldodecyl methacrylate as a polymerizable (meth)acrylate monomer, 30 mass % of the raw material (4) from Production Example 4 which contained stearyl methacrylate as a polymerizable (meth)acrylate monomer, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.0751 parts by mass and the content of water was 0.0005 parts by mass per 100 parts by mass of the polymerizable (meth)acrylate monomers, and the content of phenolic hydroxyl-containing compounds was below the detection limit). The results of the evaluations of the methacrylate polymer are described in Table 1.

Example 7

A methacrylate polymer weighing 80 g was obtained in the same manner as in Example 3, except that the feedstock used in Example 3 was replaced by 85 g of a feedstock mixture which contained 30 mass % of the raw material (5) from Production Example 5 which contained 2-octyldodecyl methacrylate as a polymerizable (meth)acrylate monomer, 30 mass % of the raw material (6) from Production Example 6 which contained stearyl methacrylate as a polymerizable (meth)acrylate monomer, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.0751 parts by mass, the content of water was 0.0005 parts by mass and the content of phenolic hydroxyl-containing compounds was 0.0003 parts by mass per 100 parts by mass of the polymerizable (meth)acrylate monomers). The results of the evaluations of the methacrylate polymer are described in Table 1.

Comparative Example 1

A methacrylate polymer weighing 80 g was obtained in the same manner as in Example 5, except that the feedstock used in Example 5 was replaced by 85 g of a feedstock mixture which contained 35 mass % of a mixture including 2-octyldodecyl methacrylate synthesized by esterification of 2-octyldodecanol with methacrylic acid (the mixture containing 98.67% 2-octyldodecyl methacrylate and, per 100 parts by mass of 2-octyldodecyl methacrylate, 0.0101 parts by mass of methoxyphenol, 0.2533 parts by mass of 2-octyldodecanol and 0.0203 parts by mass of water), 35 mass % of a mixture including n-stearyl methacrylate synthesized by esterification of n-stearyl alcohol with methacrylic acid (the mixture containing 99.26° n-stearyl methacrylate and, per 100 parts by mass of n-stearyl methacrylate, 0.0252 parts by mass of methoxyphenol, 0.3425 parts by mass of n-stearyl alcohol and 0.0181 parts by mass of water), and 30 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.2066 parts by mass, the content of water was 0.0134 parts by mass and the content of phenolic hydroxyl-containing compounds was 0.0123 parts by mass per 100 parts by mass of the polymerizable (meth)acrylate monomers). The results of the evaluations of the methacrylate polymer are described in Table 1.

Comparative Example 2

A methacrylate polymer weighing 80 g was obtained in the same manner as in Example 3, except that the feedstock used in Example 3 was replaced by 85 g of a feedstock mixture which contained 30 mass % of the raw material (7) from Production Example 7 which contained 2-octyldodecyl methacrylate as a polymerizable (meth)acrylate monomer, 30 mass % of the raw material (8) from Production Example 8 which contained stearyl methacrylate as a polymerizable (meth)acrylate monomer synthesized in Production Example 8, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.2041 parts by mass and the content of water was 0.0005 parts by mass per 100 parts by mass of the polymerizable (meth)acrylate monomers, and the content of phenolic hydroxyl-containing compounds was below the detection limit). The results of the evaluations of the methacrylate polymer are described in Table 1.

Comparative Example 3

A methacrylate polymer was produced as described below with reference to Synthetic Example 3 of JP-A-2015-013964. A thoroughly dried, 2 L three-necked flask was fitted with a stirring blade, a Dimroth condenser and a three-way cock, and the inside was purged with nitrogen. At room temperature, 500 g of a mixture as a feedstock was added which contained 30 mass % of the raw material (3) from Production Example 3 which contained 2-octyldodecyl methacrylate as a polymerizable (meth)acrylate monomer, 30 mass % of the raw material (4) from Production Example 4 which contained stearyl methacrylate as a polymerizable (meth)acrylate monomer, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.07508 parts by mass and the content of water was 0.0051 parts by mass per 100 parts by mass of the polymerizable (meth)acrylate monomers, and the content of phenolic hydroxyl-containing compounds was below the detection limit). Further, there were added 500 g of a highly refined mineral oil and 0.53 g of cumyldithiobenzoic acid (CDTBA). The mixture was stirred to give a uniform solution. The solution was cooled to 0° C. in an ice bath, and the reaction system was evacuated to vacuum and purged with nitrogen five times with use of a diaphragm pump. Under a flow of nitrogen, 0.0083 g of azobisisobutyronitrile (AIBN) as a radical initiator was added through a sample inlet, and the polymerization was performed in a nitrogen atmosphere at a solution temperature of 90° C. for 12 hours. Thus, a solution containing a methacrylate polymer was obtained. The results of the evaluations of the methacrylate polymer are described in Table 1.

Comparative Example 4

A methacrylate polymer was produced as described below with reference to Example 1 of Japanese Patent No. 4681187. A thoroughly dried, 2 L three-necked flask was fitted with a stirring blade, a Dimroth condenser and a three-way cock, and the inside was purged with nitrogen. At room temperature, 500 g of a mixture as a feedstock was added which contained 30 mass % of the raw material (3) from Production Example 3 which contained 2-octyldodecyl methacrylate as a polymerizable (meth)acrylate monomer, 30 mass % of the raw material (4) from Production Example 4 which contained stearyl methacrylate as a polymerizable (meth)acrylate monomer, and 40 mass % of a methyl methacrylate raw material (manufactured by KURARAY CO., LTD.; the raw material containing at least 99.9% methyl methacrylate and, per 100 parts by mass of methyl methacrylate, 0.0003 parts by mass of water, not more than 0.0002 parts by mass of methanol, and 0.0001 part by mass of 2,4-dimethyl-6-tert-butylphenol as a polymerization inhibitor) (the content of alcohols was 0.07508 parts by mass and the content of water was 0.0051 parts by mass per 100 parts by mass of the polymerizable (meth)acrylate monomers, and the content of phenolic hydroxyl-containing compounds was below the detection limit). Further, 500 g of a highly refined mineral oil was added, and nitrogen was passed to effect deactivation. Subsequently, 0.18 g of CuBr and 0.22 g of a ligand (pentamethyldiethylenetriamine) (PMDETA) were added as a catalyst. The mixture was heated to 90° C., and 0.45 g of an initiator (ethyl-2-bromoisobutyrate) was added. The temperature inside the three-necked flask was increased to 100° C., and the polymerization was performed for 20 hours. Thus, a solution containing a methacrylate polymer was obtained. The results of the evaluations of the methacrylate polymer are described in Table 1.

TABLE 1

|  |  | Ex. 1 | Ex. 2 | Ex. 3 | Ex. 4 | Ex. 5 | Ex. 6 |
|---|---|---|---|---|---|---|---|
| Mw | g/mol | 81,800 | 126,600 | 204,800 | 247,500 | 322,400 | 192,400 |
| Mn | g/mol | 75,600 | 111,300 | 168,700 | 179,600 | 216,000 | 155,800 |
| Mw/Mr | | 1.08 | 1.14 | 1.21 | 1.38 | 1.49 | 1.24 |
| Half-value width | | 0.208 | 0.206 | 0.214 | 0.237 | 0.277 | 0.269 |
| Width a | | 0.0875 | 0.0899 | 0.0913 | 0.0941 | 0.0948 | 0.111 |
| Composition ratio in polymer | | | | | | | |
| Methyl methacrylate | mass % | 40 | 40 | 40 | 40 | 40 | 40 |
| N-stearyl methacrylate | mass % | 30 | 30 | 30 | 30 | 30 | 30 |
| 2-Octyldodecyl methacrylate | mass % | 30 | 30 | 30 | 30 | 30 | 30 |

|  |  | Ex. 7 | Comp. Ex. 1 | Comp. Ex. 2 | Como. Ex. 3 | Comp. Ex. 4 |
|---|---|---|---|---|---|---|
| Mw | g/mol | 223,300 | 169,300 | 430,700 | 235,200 | 262,800 |
| Mn | g/mol | 167,900 | 81,300 | 137,700 | 204,900 | 223,900 |
| Mw/Mr | | 1.33 | 2.08 | 3.13 | 1.15 | 1.15 |
| Half-value width | | 0.249 | 0.707 | 0.770 | 0.290 | 0.272 |
| Width a | | 0.0937 | 0.239 | 0.163 | 0.141 | 0.130 |
| Composition ratio in polymer | | | | | | |
| Methyl methacrylate | mass % | 40 | 30 | 40 | 40 | 40 |
| N-stearyl methacrylate | mass % | 30 | 35 | 30 | 30 | 30 |
| 2-Octyldodecyl methacrylate | mass % | 30 | 35 | 30 | 30 | 30 |

The methacrylate polymers of Examples 1 to 7 exhibited good solubility in a base oil, and attained superior shear viscosity stability as compared to the methacrylate polymers of Comparative Examples 1 to 4 having a higher value a than specified in the present invention.

The invention claimed is:

1. A (meth)acrylate polymer (A) comprising structural units represented by formula (1):

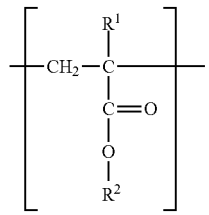

(1)

wherein $R^1$ is a hydrogen atom or a methyl group, and $R^2$ is a $C_{10-36}$ alkyl group,
the (meth)acrylate polymer (A) being such that in a differential molecular weight distribution curve obtained by a gel permeation chromatography (GPC) measurement which shows the polystyrene-equivalent molecular weight of the (meth)acrylate polymer (A) normalized so that the intensity of the peak-top polystyrene-equivalent molecular weight M (t) is 1, the value a represented by equation (2) is not more than 0.12:

$$a = \mathrm{Log}\, M_h(t_{1/2}) - \mathrm{Log}\, M(t) \tag{2}$$

wherein $M_h$ ($t_{1/2}$) is the polystyrene-equivalent molecular weight at a point on a higher molecular weight side where the intensity is 0.5.

2. The (meth)acrylate polymer (A) according to claim 1, wherein in the differential molecular weight distribution curve, the half-value width Log $M_h$ ($t_{1/2}$)–Log $M_1$ ($t_{1/2}$) is not more than 0.3 wherein $M_1$ ($t_{1/2}$) is the polystyrene-equivalent molecular weight at a point on a lower molecular weight side where the intensity is 0.5.

3. The (meth)acrylate polymer (A) according to claim 1, wherein the content of the structural units represented by the formula (1) is 40 to 80 mass % of the mass of all structural units constituting the (meth)acrylate polymer (A).

4. The (meth)acrylate polymer (A) according to claim 1, wherein the polystyrene-equivalent weight average molecular weight Mw calculated by the GPC measurement is 50,000 to 500,000.

5. A method for production of the (meth)acrylate polymer (A) of claim 1, the method comprising anionic polymerization in the presence of an organoaluminum compound.

* * * * *